US011016693B2

(12) United States Patent
Pletka et al.

(10) Patent No.: US 11,016,693 B2
(45) Date of Patent: May 25, 2021

(54) BLOCK HEALTH ESTIMATION FOR WEAR LEVELING IN NON-VOLATILE MEMORIES

(71) Applicant: INTERNATIONAL BUSINESS MACHINES CORPORATION, Armonk, NY (US)

(72) Inventors: Roman A. Pletka, Uster (CH); Sasa Tomic, Kilchberg (CH); Nikolaos Papandreou, Thalwil (CH); Nikolas Ioannou, Zurich (CH); Aaron D. Fry, Richmond, TX (US); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 16/014,938

(22) Filed: Jun. 21, 2018

(65) Prior Publication Data

US 2019/0391752 A1    Dec. 26, 2019

(51) Int. Cl.
*G06F 3/06* (2006.01)

(52) U.S. Cl.
CPC ............ *G06F 3/0649* (2013.01); *G06F 3/064* (2013.01); *G06F 3/0616* (2013.01); *G06F 3/0679* (2013.01)

(58) Field of Classification Search
CPC .... G06F 3/0649; G06F 3/0616; G06F 3/0679; G06F 3/064; G06F 12/0246; G06F 2212/1036; G06F 2212/7204; G06F 3/0653; G06F 2212/7211; G06F 3/0688
See application file for complete search history.

(56) References Cited

U.S. PATENT DOCUMENTS

| 8,560,922 B2 | 10/2013 | Bivens et al. |
|---|---|---|
| 2006/0106972 A1 | 5/2006 | Gorobets et al. |
| 2006/0161728 A1 | 7/2006 | Bennett et al. |
| 2007/0198786 A1 | 8/2007 | Bychkov et al. |
| 2007/0266200 A1 | 11/2007 | Gorobets et al. |
| 2010/0262792 A1 | 10/2010 | Hetzler et al. |
| 2011/0087832 A1 | 4/2011 | Biswas et al. |
| 2015/0178191 A1* | 6/2015 | Camp ................ G06F 12/0246 711/103 |

(Continued)

OTHER PUBLICATIONS

Pletka et al. "Health-Binning: Maximizing the Performance and the Endurance of Consumer-Level NAND Flash", IBM Research—IBM Zurich Research Laboratory, SYSTOR '16, ACM 978-1-4503-4381-7/16/06, Jun. 6-8, 2016.

(Continued)

*Primary Examiner* — Charles Rones
*Assistant Examiner* — Tong B. Vo
(74) *Attorney, Agent, or Firm* — Brian F. Russell; Stosch Sabo

(57) ABSTRACT

In at least one embodiment, a controller of a non-volatile memory having a plurality of blocks of physical memory estimates a current value of a block health metric of the particular block based on a previous value of the block health metric and a reference block wear curve. The controller assigns the particular block a health grade based on the estimated current value of the block health metric and performs data placement in the block in accordance with the assigned health grade. The controller may calibrate a set of read threshold voltages of the particular block prior to estimating the current value of the block health metric.

19 Claims, 10 Drawing Sheets

(56) References Cited

U.S. PATENT DOCUMENTS

| | | | |
|---|---|---|---|
| 2015/0199232 A1* | 7/2015 | Tressler | G11C 29/42 |
| | | | 714/755 |
| 2016/0034206 A1* | 2/2016 | Ryan | G11C 16/349 |
| | | | 711/103 |
| 2016/0103630 A1* | 4/2016 | Shen | G06F 3/0653 |
| | | | 714/37 |
| 2016/0110124 A1* | 4/2016 | Camp | G06F 11/076 |
| | | | 714/704 |
| 2016/0342344 A1* | 11/2016 | Kankani | G06F 3/0616 |
| 2017/0003880 A1* | 1/2017 | Fisher | G06F 3/061 |
| 2017/0091006 A1 | 3/2017 | Camp et al. | |
| 2019/0079861 A1* | 3/2019 | Amaki | G11C 29/52 |
| 2019/0215016 A1* | 7/2019 | Cometti | G06F 3/0616 |

OTHER PUBLICATIONS

Papandreou et al. "Techniques for Retention and Read-Disturb Aware Health Binning", U.S. Appl. No. 15/725,699, filed Oct. 5, 2017.

\* cited by examiner

BLOCK HEALTH ESTIMATION FOR WEAR LEVELING IN NON-VOLATILE MEMORIES

BACKGROUND OF THE INVENTION

This disclosure relates to data processing and data storage, and more specifically, to block health estimation for wear leveling in non-volatile memories.

NAND flash memory is an electrically programmable and erasable non-volatile memory technology that stores one or more bits of data per memory cell as a charge on the floating gate of a transistor or a similar charge trap structure. The amount of charge on the floating gate modulates the threshold voltage of the transistor. By applying a proper read voltage and measuring the amount of current, the programmed threshold voltage of the memory cell can be determined and thus the stored information can be detected. Memories storing one, two, three and four bits per cell are respectively referred to in the art as Single Level Cell (SLC), Multi-Level Cell (MLC), Three Level Cell (TLC), and Quad Level Cell (QLC) memories.

In a typical implementation, a NAND flash memory array is organized in physical blocks (also referred to as "erase blocks") of physical memory, each of which includes multiple physical pages each in turn containing a multiplicity of memory cells. By virtue of the arrangement of the word and bit lines utilized to access memory cells, flash memory arrays have generally been programmed on a physical page basis, but erased on a physical block basis. Blocks must be erased prior to being programmed.

As is well known in the art, NAND flash memory is inherently susceptible to bit errors, including error caused by program disturb effects, over-programming effects, read disturb effects, data retention (i.e., errors attributable to decay of the gate charge of programmed cells over time), and wear (i.e., errors attributable to damage to the gate dielectric due to the number of cell program/erase (P/E) cycles to which the cell is subjected). In general, the bit error rate (BER) observed for a physical page of memory that is attributable to wear is permanent and increases monotonically over the life of a NAND flash memory. Similarly, program disturb and over-programming effects can be viewed as permanent; even though they disappear after an erase operation, these two types of effects influence the BER already directly after the pages are programmed. Errors, such as those caused by read disturbs and data retention, are more transient and, although generally increasing over time, disappear by erasure of the blocks containing the affected physical pages. After a physical page is programmed, these transient effects begin to reappear gradually with increasing time and an increasing number of reads.

Data storage systems employing flash memory as a storage media generally implement flash management functions to mitigate these inherent error characteristics of flash memory. Existing systems commonly integrate at least some of these flash management functions into the data path (e.g., error correcting code (ECC) encoding and RAID-like data protection schemes), while other flash management functions operate in the background independently of any external (i.e., host) requests for the data stored in the flash memory. Examples of background flash management functions common in enterprise-class flash arrays include read sweeping, which entails reading individual physical pages to detect and correct bit errors, wear leveling, which seeks to equalize the P/E cycle counts for all physical blocks, and calibration, which conventionally determines appropriate read threshold voltages for each block or sub-block.

As is well known, wear-induced errors are not distributed uniformly across all blocks in a NAND flash memory. Consequently, active management is required in order to balance wear across all blocks and thus extend the useful life of a NAND flash memory. In order to promote balanced wear (i.e., "wear leveling"), a wear or block health characteristic of each block is determined in the background by a controller, and this wear or block health characteristic is then utilized by the controller in a health binning process to assign blocks to various health grades, which can be defined, for example, as by a fixed or variable percentage of health distribution. A data placement function of the controller can then promote wear leveling by mapping more frequently updated data (i.e., "hotter" data) to healthier blocks that have a longer estimated remaining useful life and by mapping less frequently updated data (i.e., "colder" data) to less healthy blocks having a shorted estimated remaining useful life.

BRIEF SUMMARY

Although health binning to promote wear leveling has been employed in prior art systems, the development of newer generations of memory technologies, such as 3D NAND flash memory, has created additional challenges in implementing health binning. For example, in prior memory technologies, transient errors did not impact the observed bit error rates significantly enough to impact health binning. However, in newer generations of memory technology, transient errors induced by data retention and read disturb effects can predominate in the observed bit error rates and therefore are no longer negligible.

As a consequence of the impact of transient effects on the bit error rates observed in newer memory technologies, the block health metric selected for use as a basis for health binning is preferably based on measurement(s) of the block health metric only in limited cases, for example, in cases in which the block health metric can be measured in a relatively short time window following the completion of the programming of a block (i.e., prior to the transient effects of retention and read disturbs being great enough to possibly falsify the apparent wear of the block). In a preferred embodiment, a calibration of a block to compensate for wear (a so-called "base calibration") is performed before determining the block health metric. Because the block health metric cannot always be measured during this brief time window due to the scheduling demands of host operations and the infrequency of base calibration, it is often necessary for the controller to estimate rather than to directly measure the block health metric utilized for health binning.

However, estimation of the block health metric has its own attendant challenges. For example, estimation of the block health metric requires keeping at least some per-block metadata; however, the storage capacity of per-block metadata is limited and tends to become more so in succeeding generations of memory as the number of blocks per die continues to increase. In addition, the computational capabilities of a controller of a NAND flash memory tend to be fairly limited. For example, the controller may not have a floating-point computational unit and may lack access to a math library, meaning that the controller cannot easily perform complex mathematical operations to estimate the value of the block health metric.

As described further herein, the challenges involved in the estimation of the block health metric are addressed by decomposing the process of block health estimation into two different computational tasks—a first computationally intensive task and a second reduced complexity task. The computationally intensive task determines from characterization data a set of wear curves representing the expected wear-related increases in bit errors over program/erase cycles (PECs) for a corresponding set of representative blocks. Because the development of these wear curves may exceed the computational capabilities of a flash controller, the computationally intensive task may be performed offline or by an alternative processor or controller in at least some embodiments. The reduced complexity task, which can be performed online by the flash controller, then employs the results of the computationally intensive task to estimate the block health metric of one or more blocks by reference to the wear curves of the reference blocks. These estimated block health metrics can then be employed in health binning and data placement to promote wear leveling.

Accordingly, in at least one embodiment, a controller of a non-volatile memory having a plurality of blocks of physical memory estimates a current value of a block health metric of the particular block based on a previous value of the block health metric and a reference block wear curve. The controller assigns the particular block a health grade based on the estimated current value of the block health metric and performs data placement in the block in accordance with the assigned health grade. The controller may calibrate a set of read threshold voltages of the particular block prior to estimating the current value of the block health metric.

DETAILED DESCRIPTION

Figure 1A:
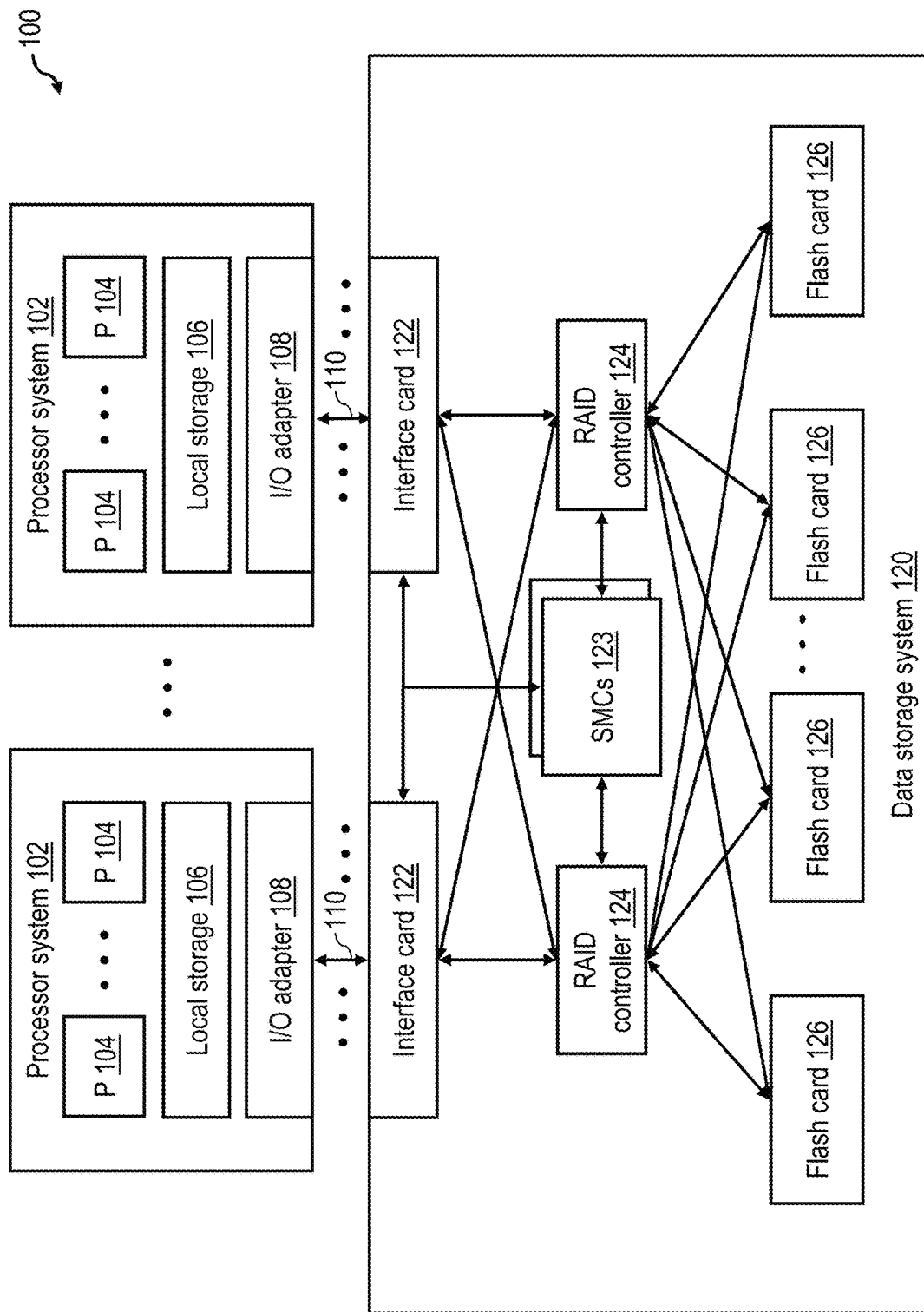
FIG. 1A is a high level block diagram of a data processing environment in accordance with one embodiment.

With reference to the figures and with particular reference to FIG. 1A, there is illustrated a high level block diagram of an exemplary data processing environment 100 including a data storage system 120 having a non-volatile memory array as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In some embodiments, data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests communicated via I/O channel 110 include host read requests by which a processor system 102 requests data from data storage system 120 and host write requests by which a processor system 102 requests storage of data in data storage system 120.

Although not required, in the illustrated embodiment, data storage system 120 includes multiple interface cards 122 through which data storage system 120 receives and responds to I/O requests of hosts via I/O channels 110. Each interface card 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to non-volatile storage media, which in the illustrated example include multiple flash cards 126 bearing NAND flash memory. In other embodiments, alternative and/or additional non-volatile storage devices can be employed.

In the depicted embodiment, the operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Figure 1B:
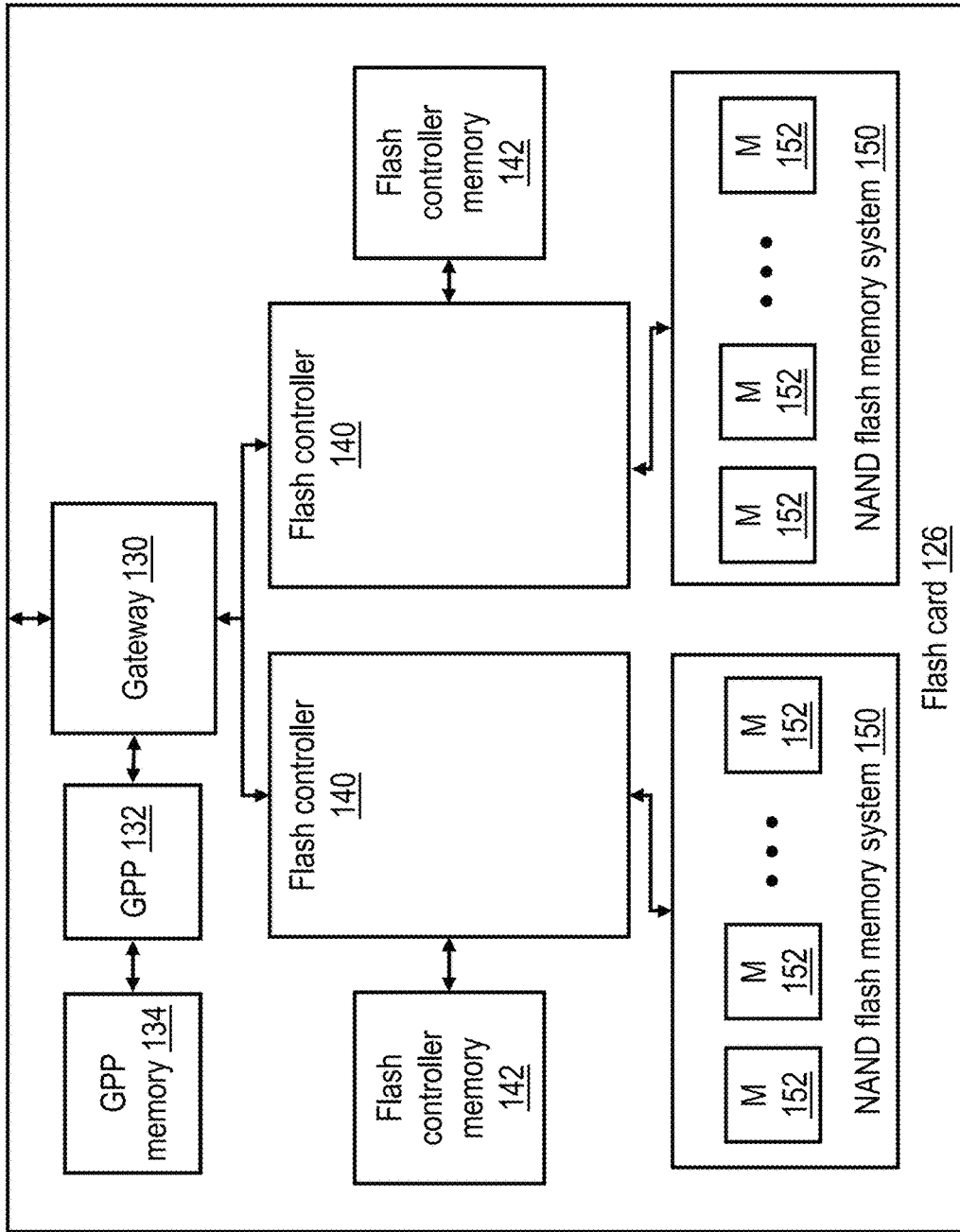
FIG. 1B is a more detailed block diagram of a flash card of the data storage system of FIG. 1A.

FIG. 1B depicts a more detailed block diagram of an exemplary embodiment of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform pre-processing on requests received by gateway 130 and/or to schedule servicing of the requests by flash card 126. GPP 132 is coupled to a GPP memory 134 (e.g., Dynamic Random Access Memory (DRAM)) that can conveniently buffer data created, referenced and/or modified by GPP 132 in the course of its processing or data flowing through the gateway 130 destined for one or more of the flash controllers 140.

Gateway 130 is further coupled to multiple flash controllers 140, each of which controls a respective NAND flash memory system 150. Flash controllers 140 can be implemented, for example, by an Application Specific Integrated Circuit (ASIC) and/or a Field Programmable Gate Array (FPGA) and/or a microprocessor, and each have an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive host read and write requests from gateway 130 that request to read data stored in NAND flash memory system 150 and/or to store data in NAND flash memory system 150. Flash controllers 140 service these requests, for example, by accessing NAND flash memory system 150 to read or write the requested data from or into NAND flash memory system 150 or by accessing a memory cache (not illustrated) associated with NAND flash memory system 150.

Flash controllers 140 implement a flash translation layer (FTL) that provides logical-to-physical address translation to enable access to specific memory locations within NAND flash memory systems 150. In general, a request received by flash controller 140 from a host device, such as a processor system 102, contains the logical block address (LBA) at which the data is to be accessed (read or written) and, if a write request, the write data to be stored to data storage system 120. The request may also specify the amount (or size) of the data to be accessed. Other information may also be communicated depending on the protocol and features supported by data storage system 120. The flash translation layer translates LBAs received from a RAID controller 124 into physical addresses assigned to corresponding physical location in NAND flash memory systems 150. Flash controllers 140 may perform address translation and/or store mappings between logical and physical addresses in a logical-to-physical translation data structure, such as a logical-to-physical translation table (LPT), which may conveniently be stored in flash controller memory 142.

NAND flash memory systems 150 may take many forms in various embodiments. In the embodiment shown in FIG. 1B, each NAND flash memory system 150 includes multiple (e.g., 32) individually addressable NAND flash memory storage devices 152. In the illustrated example, the flash memory storage devices 152 take the form of a board-mounted flash memory modules, for example, Multi-Level Cell (MLC), Three Level Cell (TLC), or Quad Level Cell (QLC) NAND flash memory modules. The effective storage capacity provided by flash memory storage devices 152 can be increased through the implementation of data compression, for example, by flash controllers 140 and/or high level controllers, such as GPPs 132, RAID controllers 124 or SMCs 123.

Figure 2:
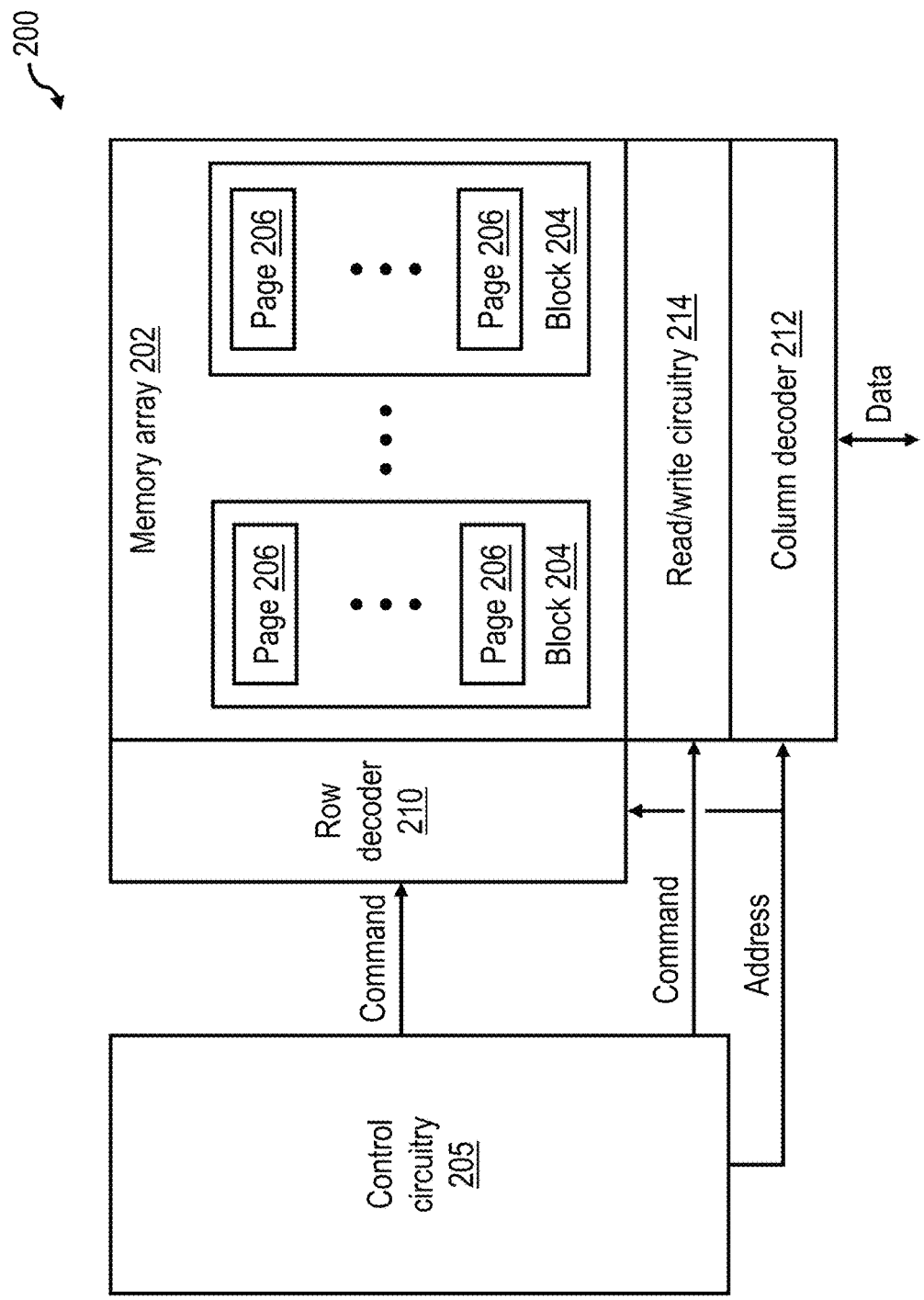
FIG. 2 depicts an exemplary NAND flash memory module in accordance with one embodiment.

Referring now to FIG. 2, there is depicted a block diagram of an exemplary flash memory module 200 that can be utilized to implement any of the NAND flash memory storage devices 152 of FIG. 1B. Flash memory module 200 includes one or more memory die, each implementing at least one memory array 202 formed of a two-dimensional or three-dimensional array of NAND flash memory cells. As indicated in FIG. 2, the memory cells within memory array 202 are physically arranged in multiple blocks 204, each in turn including multiple physical pages 206. These physical pages can be managed in page groups, which can each be formed, for example, of all the pages coupled to a common wordline, of all pages in one or more layers in a 3D NAND flash, of a set of pages in one or more layers, or generally of physical pages with similar characteristics.

As is known to those skilled in the art, NAND flash memory, such as that employed in memory array 202, must be erased prior to being programmed. Further, NAND flash memory can be (but is not required to be) constrained by its construction such that the smallest granule of storage that can be erased is a block 204 and the smallest granule of storage that can be accessed by a read or write request is fixed at the size of a single physical page 206. It should be appreciated in this regard that the LBAs provided by host devices correspond to logical pages within a logical address space, where each logical page typically has a size of 4 kilobytes (kB). Physical pages 206, in contrast, typically have a larger size, for example, 16 kB, and can thus store multiple logical pages.

Flash memory module 200 further includes a row decoder 210 through which word lines of memory array 202 can be addressed and a column decoder 212 through which bit lines of memory array 202 can be addressed. In addition, flash memory module 200 includes read/write circuitry 214 that enables the memory cells of a physical page 206 to be programmed or read in parallel. Flash controller 200 additionally includes control circuitry 205 that provides chip-level control of operation of memory array 202, including read and write accesses made to physical pages 206 in memory array 202, erasure of blocks 204, and the amplitude, duration and polarity of related voltages applied to memory array 202.

Having described the general physical structure of one exemplary embodiment of a data storage system 120, certain operational aspects of data storage system 120 are now described with reference to FIG. 3, which is a high level flow diagram of the flash management functions and data structures employed by a GPP 132 and/or flash controller 140 in accordance with one embodiment.

Data storage system 120 does not generally allow external devices (e.g., hosts) to directly address and/or access the physical memory locations within NAND flash memory systems 150. Instead, data storage system 120 is generally configured to present to host devices one or more logical volumes each having a contiguous logical address space, thus allowing host devices to read and write data to and from logical block addresses (LBAs) within the logical address space while permitting one or more of the various levels of controllers (e.g., system management controller 123, RAID controllers 124, flash controllers 140 and GPP 132) to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 performs logical-to-physical address translation for an associated set of LBAs using a logical-to-physical address translation data structure, such as logical-to-physical translation (LPT) table 300, which can be stored, for example, in the associated flash controller memory 142. It should be noted that the logical address supplied to flash controller(s) 140 may be different from the logical address originally supplied to data storage system 120, since various components within data storage system 120 may perform address translation operations between the external devices and the flash controller(s) 140.

Flash management code running on the GPP 132 tracks erased blocks of NAND flash memory system 150 that are ready to be used in ready-to-use (RTU) queues 306, which may be stored, for example, in GPP memory 134. In the depicted embodiment, flash management code running on the GPP 132 maintains one RTU queue 306 per channel (i.e., per data bus), and an identifier of each erased block that is to be reused is enqueued in the RTU queue 306 corresponding to its channel. A build block stripes function 320 performed by flash management code running on the GPP 132 constructs new block stripes for storing data and associated parity information from the erased blocks enqueued in RTU queues 306. The new block stripes are then queued to the flash controller 140 for data placement. Block stripes are preferably formed of one or more physical blocks residing in different channels, meaning that build block stripes function 320 can conveniently construct a block stripe by drawing each block of the new block stripe from a different RTU queue 306. In general, build block stripes function 320 attempts to construct stripes from blocks of approximately equal health (i.e., expected remaining useful life). Because all of the physical block(s) composing a block stripe are generally managed together as a unit for programming and erasure, a block stripe is also referred to in the art as a logical erase block (LEB).

In response to write request received from a host, such as a processor system 102, a data placement function 310 of flash controller 140 determines by reference to LPT table 300 whether the target LBA(s) indicated in the write request is/are currently mapped to physical memory page(s) in NAND flash memory system 150 and, if so, changes the status of each data page currently associated with a target LBA to indicate that the associated data is no longer valid. In addition, data placement function 310 allocates a page stripe if necessary to store the write data of the write request and any non-updated data (i.e., for write requests smaller than a logical page, the remaining valid data from a previous write to the same logical address which is not being overwritten and which must be handled in a read-modify-write manner) from an existing page stripe, if any, targeted by the write request, and/or stores the write data of the write request and any non-updated (i.e., still valid) data from an existing page stripe, if any, targeted by the write request to an already allocated page stripe which has free space left. The page stripe may be allocated from either a block stripe already allocated to hold data or from a new block stripe built by build block stripes function 320. In a preferred embodiment, the page stripe allocation can be based on the health of the blocks available for allocation and the "heat" (i.e., estimated or measured write access frequency) of the LBA of the write data. Data placement function 310 then writes the write data, associated metadata (e.g., cyclic redundancy code (CRC) and error correcting code (ECC) values), and parity information for the page stripe in the allocated page stripe. Flash controller 140 also updates LPT table 300 to associate the physical page(s) utilized to store the write data with the LBA(s) indicated by the host device. Thereafter, flash controller 140 can access the data to service host read requests by reference to LPT table 300 as further illustrated in FIG. 3.

Once programming of physical pages in a block stripe has closed, flash controller 140 places an identifier of the block stripe into one of occupied block queues 302, which flash management code running on the GPP 132 utilizes to facilitate garbage collection. As noted above, through the write process, logical pages are invalidated, and therefore portions of the NAND flash memory system 150 become unused. The associated flash controller 140 (and/or GPP 132) eventually needs to reclaim this space through garbage collection performed by a garbage collector 312. Garbage collector 312 selects particular block stripes for garbage collection based on a number of factors including, for example, the health of the physical blocks 204 within the block stripes, the amount of dummy data (if any) in the block stripes, and how much of the data within the erase blocks 204 is invalid. In the illustrated example, garbage collection is performed on entire block stripes (or LEBs), and flash management code running on GPP 132 logs identifiers of the block stripes ready to be recycled in a relocation queue 304, which can conveniently be implemented in the associated flash controller memory 142 or GPP memory 134.

The flash management functions performed by GPP 132 or flash controller 140 additionally include a relocation function 314 that relocates the data held in block stripes enqueued in relocation queue 304. To relocate such data, relocation function 314 issues relocation write requests to data placement function 310 to request that the valid data of the old block stripe be written to a new block stripe in NAND flash memory system 150. In addition, relocation function 314 updates LPT table 300 to remove the current association between the logical and physical addresses of the data. Once all remaining valid data has been moved from the old block stripe, the old block stripe is passed to dissolve block stripes function 316, which decomposes the old block stripe into its constituent physical blocks 204, thus disassociating the physical blocks 204. Each of the physical blocks 204 formerly forming the dissolved block stripe is then erased under the direction of flash controller 140 and/or the control circuitry 205 of the relevant flash memory module 200, and a corresponding program/erase cycle (PEC) count 334 for each erased block is incremented. Based on the PEC count 334 and block health metrics 332 of each erased block 204, each erased block 204 is either retired (i.e., withdrawn from use) by a block retirement function 318 among the flash management functions executed on GPP 132, or alternatively, prepared for reuse by placing the block 204 on the appropriate ready-to-use (RTU) queue 306 in the associated GPP memory 134.

Figure 3:
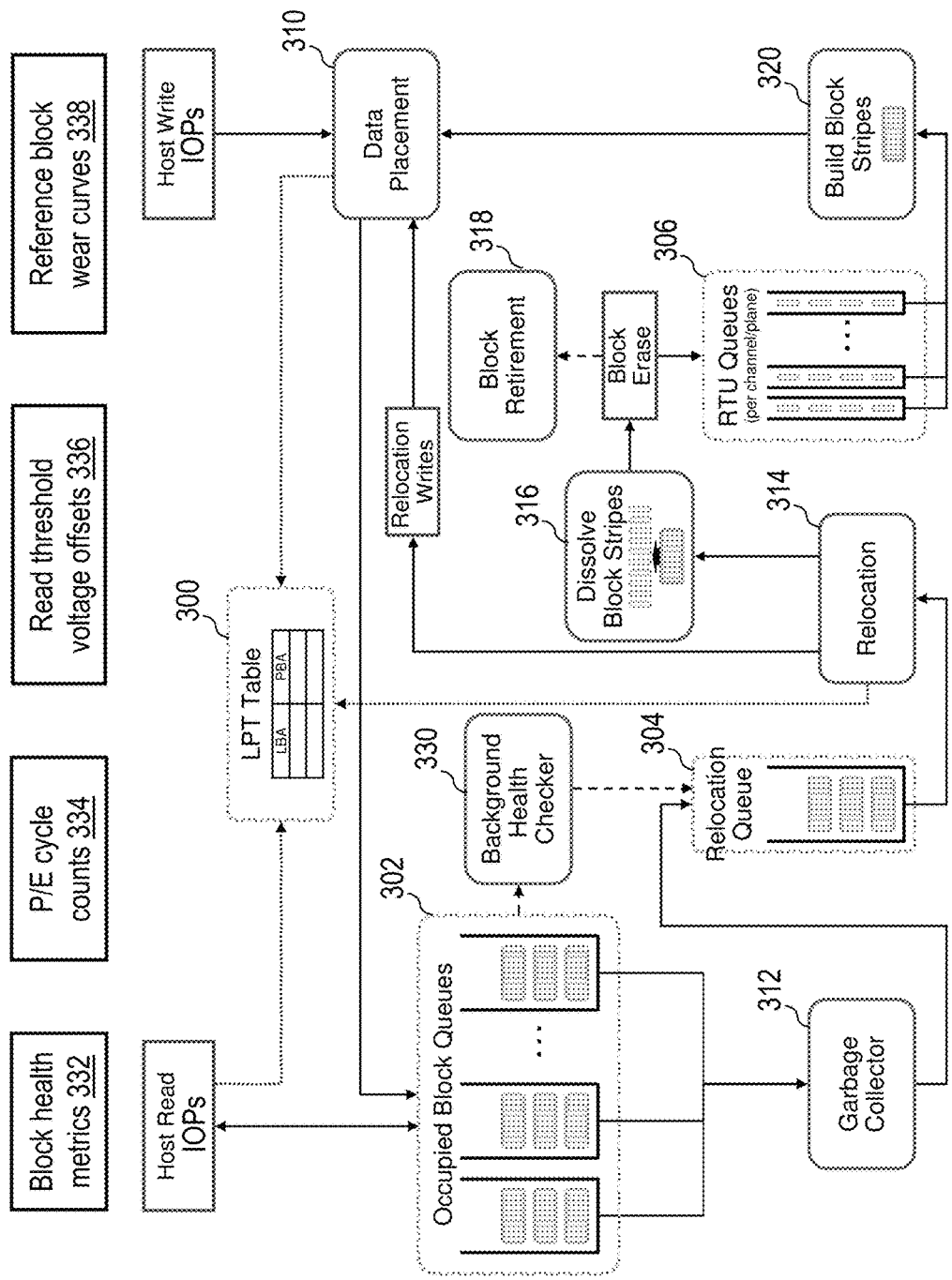
FIG. 3 is a high level flow diagram of the flash management functions and data structures employed in flash management in accordance with one embodiment.

As further shown in FIG. 3, the flash management functions executed on GPP 132 and/or flash controller 140 additionally include a background health checker 330. Background health checker 330, which operates independently of the read and write requests of hosts such as processor systems 102, continuously determines one or more block health metrics 332 for physical blocks 204 belonging to block stripes recorded in occupied block queues 302. Based on the one or more of the block health metrics 332, a wear leveling function within background health checker 330 places block stripes on relocation queue 304 for handling by relocation function 314. Key block health metrics 332 preferably monitored and recorded by background health checker 330 relate to the bit error rate (BER) metrics observed for valid blocks and physical pages, and may include, for example, an average per-page bit error count, per-block bit error count, average raw bit error rate (BER) of a block, maximum raw BER of a worst codeword in a block (mRBER), a rate of change (i.e., derivative) of any of the preceding bit error rates, and/or a logarithm of any of these values. In order to obtain the most accurate health estimate possible, a health grade can be determined from an analysis of valid and invalid data, thereby ensuring that blocks containing almost entirely invalid data are fully analyzed to determine overall block health.

The flash management functions executed on GPP 132 and/or flash controller 140 further include a calibration function that establishes and adjusts the read threshold voltage offsets 336 over the life of a NAND flash memory system 150 in order to compensate for positive and/or negative shifts in the voltage distributions of memory cells with respect to the existing set of read threshold voltages utilized to distinguish between the different bit values. In some embodiments, this function can be incorporated into the operation of background health checker 330.

In some embodiments, it may be useful and desirable to track the read voltage threshold offsets 336 for each unit of physical memory (e.g., page group or block) using a combination of multiple parameters. For example, in one preferred embodiment, read voltage thresholds offsets 336 may be specified by applying a combination of offset to each default read voltage threshold, including a "base" component ($V_{base}$) that tracks a permanent deviation from the default read voltage threshold (e.g., due to the wear caused by P/E cycling and other permanent effects) and a "temporary" component ($V_{temp}$) that tracks temporary changes of read voltage thresholds (e.g., due to data retention, read disturb effects, and other transient effects).

Figure 4:
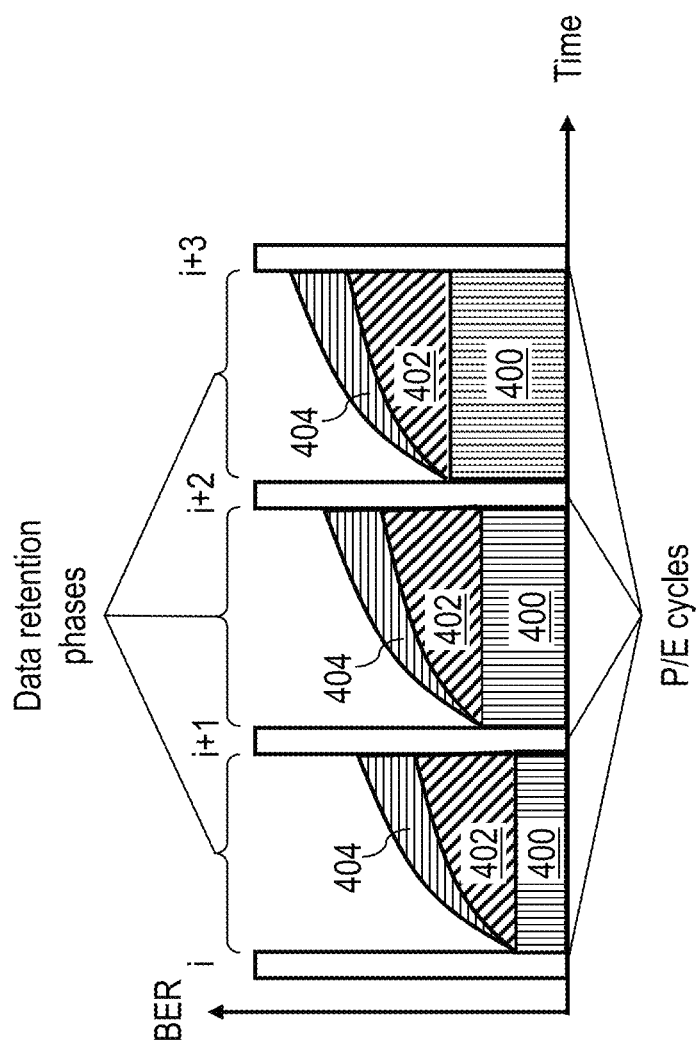
FIG. 4 is a graph of bit error rate (BER) of a physical block of NAND flash memory over time.

FIG. 4 is a graph of bit error rate (BER) over time for a typical physical page 206 in a physical block 204 of NAND flash memory, which shows the contribution to the BER of both permanent and transient sources of errors. A very similar behavior can be observed for the worst page 206 in a physical block 204 or for the average BER of all pages 206 in a block 204. In the graph, a number of program/erase (P/E) cycles i, i+1, i+2, i+3, . . . , in which the physical page 206 is first erased and then programmed, are shown. Between chronologically adjacent P/E cycles, the physical page 206 is in a data retention phase in which the data programmed into the cells of the physical page 206 is retained.

During each P/E cycle, the data programmed within physical page 206 is subject to a BER including at least three components, namely, a first component 400 attributable to wear, program disturb effects, and over-programming effects, a second component 402 attributable to data retention effects, and a third component 404 attributable to read disturb effects. As shown, the first component 400 of the BER is permanent and increases monotonically over the useful lifetime of the physical page 206. However, the second component 402 and third component 404 of the BER are transient and, although generally higher at the end of each succeeding data retention phase, are reduced between the end of one data retention phase and the beginning of the next data retention phase by the erasure performed in the intervening P/E cycle. Even though program disturbs and over-programming effects disappear after an erase operation, they are considered as being permanent effects for the following reasons. First, program disturb effects, sometimes also denoted as cell-to-cell program interference, occur when one or more bits in adjacent cells not intended to be programmed are changed during a cell program operation due to parasitic capacitance coupling between these cells. Second, over-programming, also denoted as program interference or program errors due to two-step programming, occurs during a first programming step, when a threshold voltage in a cell on a bitline within a block is incorrectly programmed to a too high value. This results in the cell not being read correctly upon the second programming step and thus in incorrect programming of subsequent pages on the same wordline within the block. Hence, these two effects influence the BER immediately after the pages are programmed and can only be distinguished from other effects by a detailed analysis of all errors in all pages on the same wordline. Therefore, program disturbs and over-programming effects are considered herein as being permanent effects.

As should be appreciated from the foregoing, the correct assignment of health grades to blocks by background health checker 330 depends on an accurate determination of block health metrics 332, which are preferably performed upon correct calibration of the read threshold voltage offsets 336 within a given time window. The correct calibration of the read threshold voltage offsets 336 is particularly sensitive to the establishment of the correct base component ($V_{base}$) that tracks a permanent deviation from the default read voltage threshold due to the wear caused by P/E cycling and other sources of permanent effects. However, as indicated by FIG. 4, the magnitude of the first component 400 of BER reflecting the permanent effects of wear (and thus the block health) can only be directly measured in a brief interval shortly after programming. For example, in some memory technologies such as 3D NAND flash, this interval may begin tens of minutes after the final physical page in the block is programmed and ends a few hours later. After this brief interval, the rapid increase in the magnitude of the other components 402, 404 of BER prevents the first component 400 (or a block health metric indicative of a magnitude thereof) from being directly measured. As a result, if first component 400 cannot be directly measured for a block of interest, GPP 132 and/or flash controller 140 preferably determine(s) a block health grade based on an estimate of the value(s) of the block health metric(s) utilized by a health binning process to assign health grades to blocks.

As described briefly above, the estimation of the value of a block health metric has its own attendant challenges. For example, in order to keep system costs low, it is desirable to implement flash controller 140 or GPP 132 with as few computational capabilities as possible, meaning that in many embodiments the computational capabilities of flash controller 140 or GPP 132 will not include a floating-point computational unit, and flash controller 140 will not have access to a math library to perform complex mathematical operations to estimate the value of the block health metric.

In at least one embodiment, the challenges involved in the estimation of the block health metric are addressed by decomposing the process of block health estimation into two different computational tasks—a first computationally intensive task and a second reduced complexity task. The computationally intensive task determines from characterization data a set of wear curves representing the expected wear-related increases in bit errors over program/erase cycles (PECs) for a corresponding set of representative blocks. Because the development of these wear curves may exceed the computational capabilities of flash controller 140, this computationally intensive task may be performed offline or by an alternative processor or controller (e.g., GPP 132 or SMC 123 or a processor system 102) in at least some embodiments. The reduced complexity task, which can be performed inline by flash controller 140 or GPP 132, employs the results of the computationally intensive task to estimate the block health metric of one or more blocks by reference to the wear curves of the reference blocks. These estimated block health metrics can then be employed in health binning and data placement to promote wear leveling, as described in detail below. Clearly, the actual location where the computationally intensive task and the reduced complexity task are executed (e.g., GPP 132, flash controller 140, SMC 123, processors system 102, or others) may vary in different embodiments depending on the computational capability and performance of these components.

Figure 5:
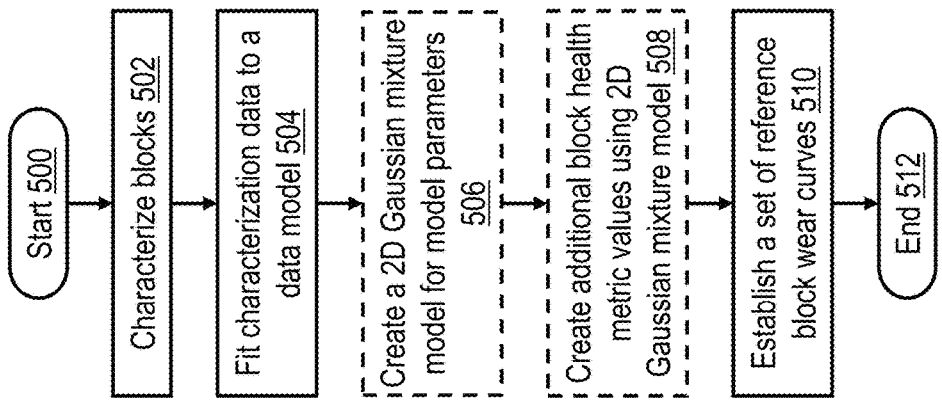
FIG. 5 is a high level logical flowchart of an exemplary process for establishing a set of reference block wear curves in accordance with one embodiment.

With reference now to FIG. 5, there is illustrated a high level logical flowchart of an exemplary process for establishing a set of reference block wear curves in accordance with one embodiment. Although in some embodiments the process of FIG. 5 can be performed by flash controller 140 and/or GPP 132, in at least some embodiments these components may lack the computational capability and/or computational resources to perform all of the illustrated steps. Consequently, in at least some embodiments, some or all of the steps of this computationally intensive process is performed off of flash card 126, for example, by an SMC 123 and/or by a processor system 102 employed as a management node for data storage system 120. Hereafter, for ease of discussion, it will be assumed that the computationally intensive process depicted in FIG. 5 is performed by an SMC 123.

The process of FIG. 5 begins at block 500 and then proceeds to block 502, which illustrates an SMC 123 characterizing the blocks of a NAND flash memory system 150. In this characterization step, a selected block health metric, hereafter assumed to be the maximum raw bit error rate of the worst codeword in the block (mRBER), is recorded for some or all of the blocks in a representative NAND flash memory 150.

At block 504, the SMC 123 fits the recorded characterization data to a data model of the evolution of the block health metric as a function of P/E cycles. Experimentally, wear of a 2D NAND flash block caused by P/E cycling has been shown to be accurately modeled as a function of the PEC count using a log-log model, such as:

$$\ln(\mathrm{mRBER}) = x_1 + x_2 \ln(\mathrm{PEC})$$

where $x_1$ and $x_2$ are coefficients distinct for each block. For at least some 3D NAND flash memories, a log-linear model such as the following may more accurately describe wear of a flash block versus PEC count:

$$\ln(\mathrm{mRBER}) = x_1 + x_2 \cdot \mathrm{PEC}$$

In general, a statistical measure, such as least-square fitting, may be utilized to evaluate and select which of these (or other) data models more accurately describes the characterization data.

Figure 6:
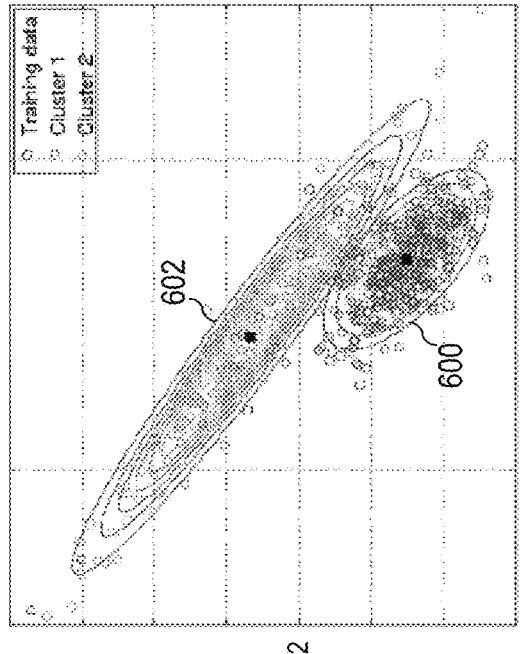
FIG. 6 is a graph of a 2D Gaussian mixture model of the parameters of log-linear data model of block wear in accordance with one embodiment.
Figure 7:
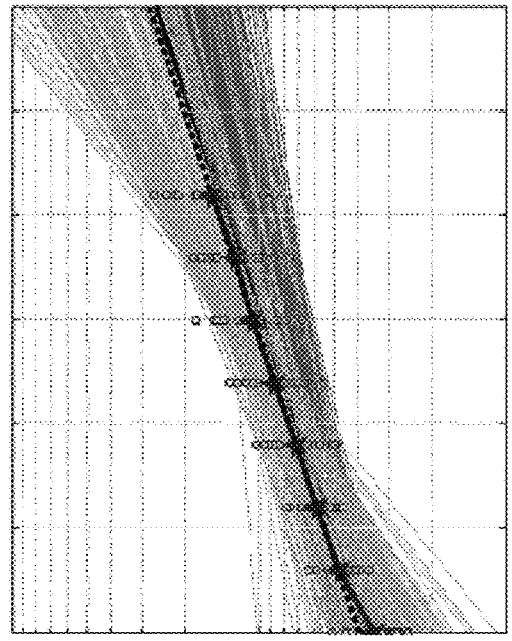
FIG. 7 is a graph of wear curves generated from modeled and characterized blocks in accordance with one embodiment.

In some embodiments, the process proceeds from block 504 directly to block 510, which is described below. However, in other embodiments, the process proceeds from block 504 to block 506, which illustrates SMC 123 creating a mixture model such as a 2D Gaussian mixture model for the model parameters. Clearly, other models could be used as well. FIG. 6 shows a plot of a 2D Gaussian mixture model for model parameters $x_1$ and $x_2$ of a log-linear model of the form noted above. As shown, the value pairs of parameters $x_1$ and $x_2$ form two general clusters, cluster 1 600 and cluster 2 602. As indicated at block 508 and as depicted in FIG. 7, this 2D Gaussian mixture model can then be utilized to create additional block health metric values of modeled blocks (as opposed to characterized blocks) over the operating lifetime of a NAND flash memory. For example, FIG. 7 is a graph of mRBER versus PEC count for 500 modeled blocks, as well as 24 characterized blocks, whose measured mRBER values are represented in FIG. 7 by circles on the wear curves. The number of characterized blocks and modeled blocks presented here are for illustration only such that data points and curves are distinguishable in the figures. They may differ in a real implementation and be significantly larger than presented here. The process of FIG. 5 then passes from block 508 to block 510.

At block 510, SMC 123 establishes a set of reference block wear curves to be utilized in estimating the value of a block health metric during operation of a NAND flash memory system 150. To reduce the volume of data that must be stored, it is preferable for the set of reference block wear curves to be small, for example, less than or equal to 20, or in some embodiments, less than or equal to 10, or in some embodiments, less than or equal to 5. In embodiments omitting blocks 506 and 508, these reference block wear curves can be selected from among the wear curves of the characterized blocks. In alternative embodiments including blocks 506 and 508, these reference block wear curves can instead by selected from the block health metric values of the modeled blocks graphed in FIG. 7.

Figure 8B:
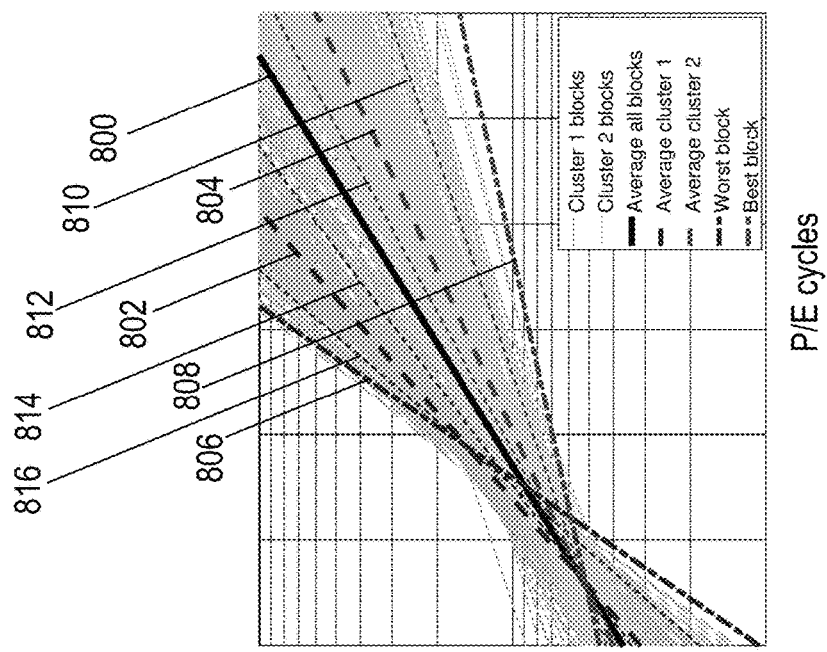
FIGS. 8A and 8B are graphs of sets of reference block wear curves established in accordance with the method of FIG. 5.
Figure 8A:
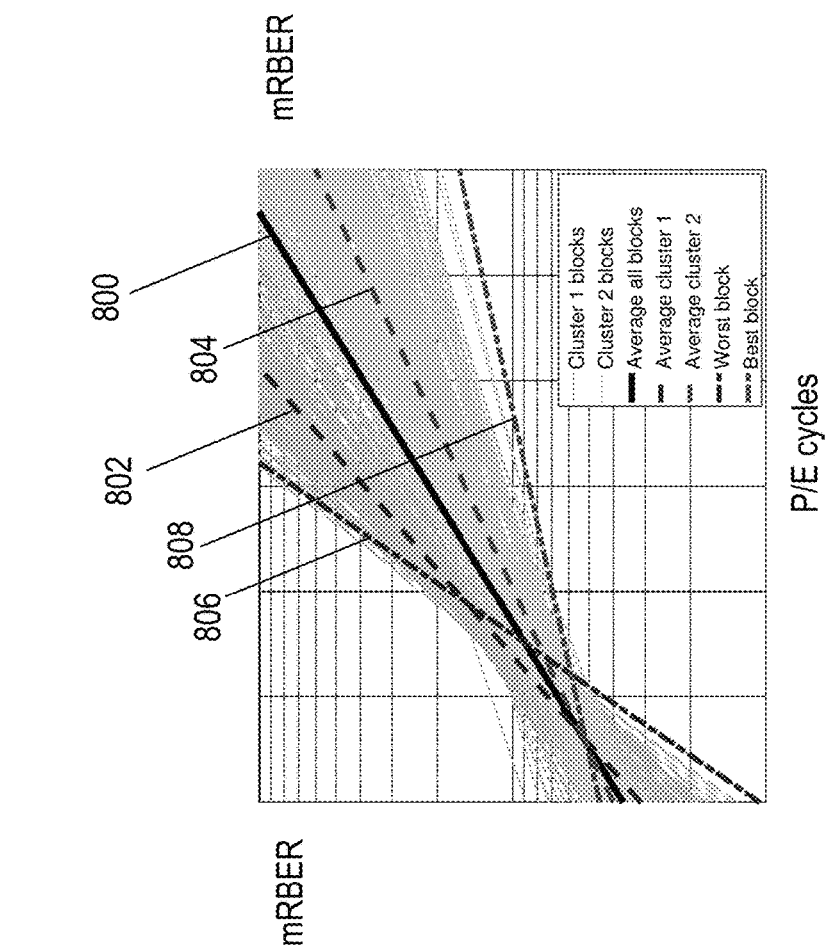

For example, FIG. 8A depicts one embodiment in which a set of 5 reference block wear curves are selected from among the 524 wear curves given in FIG. 7. In this example, the set of 5 reference block wear curves includes: (1) reference block wear curve 800, which is formed by averaging the values of all 524 wear curves, (2) reference block wear curve 802, which is formed by averaging the wear curves generated from cluster 1 600, (3) reference block wear curve 804, which is formed by averaging the wear curves generated from cluster 2 602, (4) reference block wear curve 806, which is the wear curve of the "worst" reference block having the highest slope, and (5) reference block wear curve 808, which is the wear curve of the "best" reference block having the lowest slope. In an alternative embodiment, the reference block wear curves of the "worst" and "best" blocks could be selected based on one or more alternative criteria, such as the highest and lowest endurance at a given mRBER. Further, other methods to determine wear curves such as the median, weighted average, weighted mean, or the like can be used alternatively or additionally.

In the example of FIG. 8B, this base set of 5 reference block wear curves 800-808 is augmented with 4 additional reference block wear curves 810-816 in order to form a set of 9 reference block wear curves. In this embodiment, additional reference block wear curves 810-816 can be formed, for example, by linear interpolation or finding the median values between adjacent pairs of curves 800-808.

Once a set of reference block wear curves of the desired size has been established at block 510 of FIG. 5, these reference block wear curves can be stored as reference block wear curves 338, for example, in GPP memory 134 or flash controller memory 142 of each flash card 126 in a NAND flash memory system 150. Thereafter, the process of FIG. 5 ends at block 512.

Figure 9:
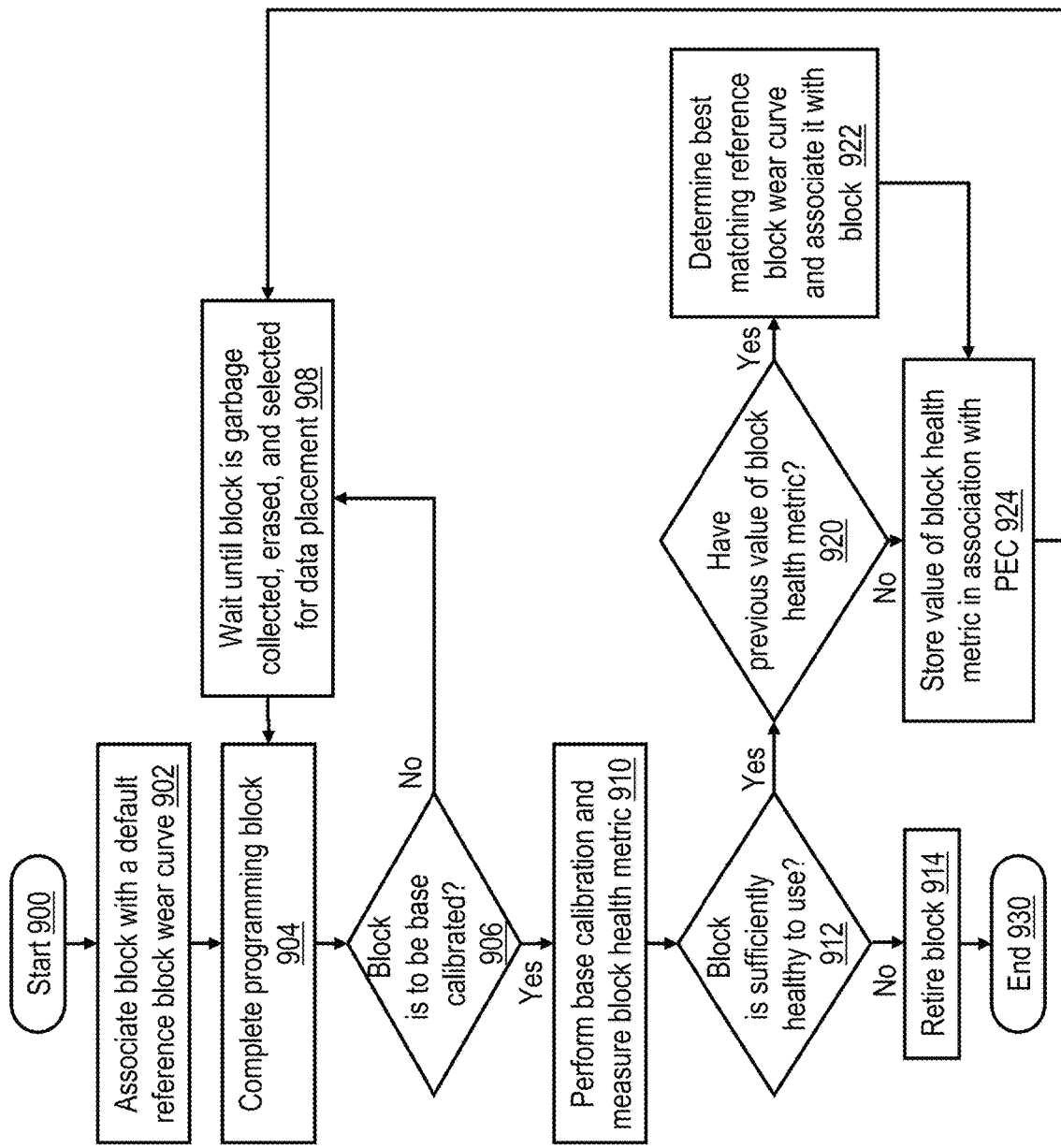
FIG. 9 is a high level logical flowchart of an exemplary process for determining a value of a block health metric in accordance with one embodiment.

With reference now to FIG. 9, there is illustrated a high level logical flowchart of an exemplary process for determining a value of a block health metric indicative of the wear on a block due to P/E cycling and other permanent effects in accordance with one embodiment. Because the process of FIG. 9 is not as computationally intensive as that depicted in FIG. 5, the illustrated process may be performed, for example, in hardware, software, firmware, and/or a combination thereof by flash controller 140 and/or GPP 132, each or both of which may be referred to herein generally as a "controller." Although the process only illustrates the determination of the block health metric of one block of a non-volatile memory, it will be appreciated that the controller can utilize the process of FIG. 9 to determine the value of a block health metric of any and all blocks in a non-volatile memory under its control.

The process begins at block 900 and then proceeds to block 902, which illustrates the controller associating a block of interest with a default reference block wear curve, for example, the average reference block wear curve 800. The association between the block and the reference block wear curve can be stored, for example, as part of the block health metrics 332 recorded for the block. At block 904, data placement function 310 completes programming of all the in-use physical pages of the block. Next, at block 906, the controller determines if the block is to be base calibrated (i.e., the $V_{base}$ read threshold voltage offset 336 is to be updated) to compensate for the wear associated with P/E cycling and other permanent effects. The controller may make the determination at block 906 based on one or more factors, including whether the block is within the base calibration interval following the conclusion of programming at block 904, the number of reads to the block, the observed BER of reads to the block, how recently the block has been base calibrated, etc. In another embodiment where no or only limited block calibration is performed, the same determination may be used, but instead of deciding to perform a base calibration or not, the controller can determine at block 906 whether or not to measure the block health metric. In response to a determination at block 906 that the block is not to be base calibrated, the process passes to block 908, which illustrates the controller waiting until the block is garbage collected, erased and again selected for data placement. The process then returns to block 904, which has been described.

In response to a determination at block 906 that the block is to be base calibrated, the controller performs base calibration of the block and measures the block health metric utilized for health binning, for example, the mRBER (block 910). As noted above, following base calibration, the value of the block health metric measured at block 910 will reflect the permanent changes caused by P/E cycling and other permanent effects, but not transient error effects caused by read disturbs, data retention, etc. In another embodiment where no or only limited calibration is performed, the controller may also directly measure the block health metric at block 910 by reading all pages of the block (i.e., block read sweep operation). At block 912, the controller determines based on the value of the block health metric measured at block 910 whether or not the block is sufficiently healthy for continued use. If not, the controller relocates the data programmed into the block and retires the block from use, as shown at block 914. Following block 914, the process of FIG. 9 ends at block 930.

Returning to block 912, if the controller determines that the value of the block health metric indicates that the block is sufficiently healthy to remain in use, the controller determines at block 920 whether or not block health metrics 332 include a previous value of the block health metric for a prior PEC count of the block, meaning that, with the value of the block health metric measured at block 910, two data points are available to update the reference block wear curve associated with the block. If not, the process passes to block 924, which is described below. If, however, a previous value of the block health metric for the block is stored in block health metrics 332, the controller determines the best matching reference block wear curve from reference block wear curves 338 and associates it with the block in block health metrics 332 (block 922). In determining the best matching reference block wear curve at block 922, the controller may select the best matching reference block wear curve based the value of the block health metric, that is, by selecting the reference block wear curve having a block health metric value for the current PEC count closest to that measured at block 910. In an alternative embodiment, the controller may select the best matching reference block wear curve based on slope, that is, by selecting the one having the closest slope to the slope of the wear curve defined by the prior and current measured values of the block health metric. In yet other embodiments, the controller may select the reference block wear curve based on both the value of the block health metric and the slope of the wear curve of the block under consideration. Note that using one of the models for the wear of a flash block introduced above or any similar model, the necessary calculations are indeed of low complexity and can be performed by using properly scaled integer operations and table lookups (i.e., for determining the logarithm where needed). Following block 922, the process proceeds to block 924.

At block 924, the controller stores the value of the block health metric measured at block 910 in association with the current PEC count of the block as part of block health metrics 332. Thereafter, the process of FIG. 9 returns to block 908 and following blocks, which have been described.

Figure 10:
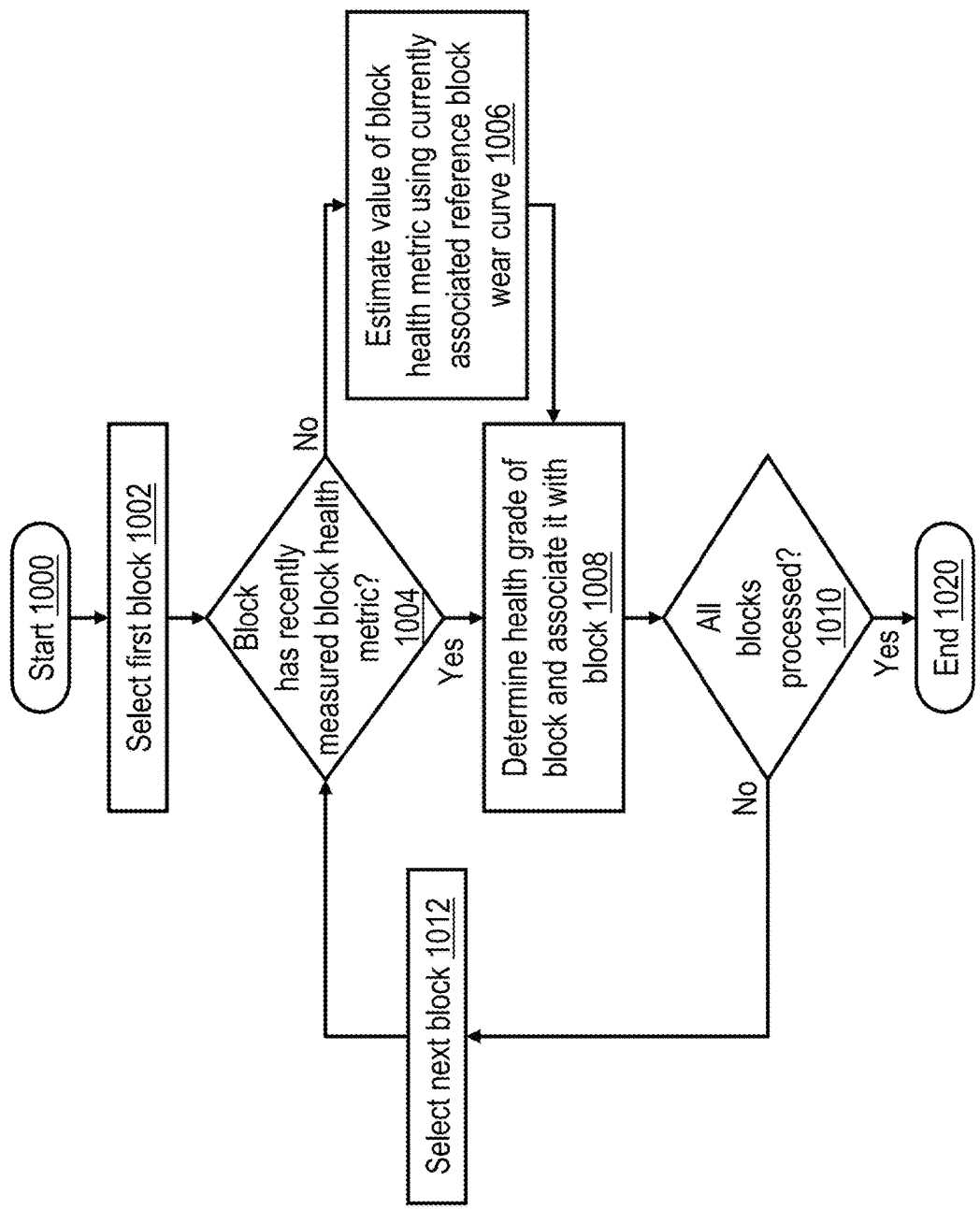
FIG. 10 is a high level logical flowchart of an exemplary process for health binning in accordance with one embodiment.

Referring now to FIG. 10, there is depicted a high level logical flowchart of an exemplary process for health binning in accordance with one embodiment. Like FIG. 9, the process of FIG. 10 is not computationally intensive and may be performed by a controller such as a flash controller 140 and/or GPP 132 in hardware, software, firmware, and/or a combination thereof The controller begins the process of FIG. 10 at block 1000, for example, in response to expiration of a predetermined time interval for health binning and/or another event in its NAND flash memory system 150. The controller then selects an initial block of physical memory for processing (block 1002) and enters a health binning processing loop including block 1004-1012 in which each in-use physical block in NAND flash memory system 150 is assigned a health grade.

At block 1004, the controller determines if the block of physical memory under consideration has a recently measured value of the block health metric utilized for health binning (e.g., mRBER), for example, a value of the block health metric measured at block 910 of FIG. 9 within a fixed or dynamically determined number of P/E cycles from the current PEC count of the block. If so, the process passes directly from block 1004 to block 1008, which illustrates the controller determining the health grade of the currently selected block based on the recently measured value of the block health metric. For example, in some embodiments, four or eight health grades may be defined based upon PEC-dependent threshold values of the block health metric, and the controller may assign a health grade to the block based on which of these threshold values is/are exceeded by the measured value of the block health metric. In general, the health grades for healthier blocks are associated with lower threshold values of the block health metric, and the health grades for less healthy blocks are associated with higher threshold values of the block health metric. The process then passes to block 1010, which is described below.

In response to determining at block 1004, that the block of physical memory under consideration does not have a recently measured value of the block health metric utilized for health binning, the process proceeds to block 1006. Block 1006 illustrates the controller estimating the value of the block health metric of the block under consideration by reference to the reference block wear curve currently associated with the block (i.e., at either block 902 or block 922 of FIG. 9). Again, using one of the models for the wear of a flash block introduced above or any similar model, the necessary calculations can indeed be of low complexity and can be performed by using properly scaled integer operations and table lookups (i.e., for determining the logarithm where needed). One exemplary procedure for performing this estimation is illustrated in FIG. 11.

Figure 11:
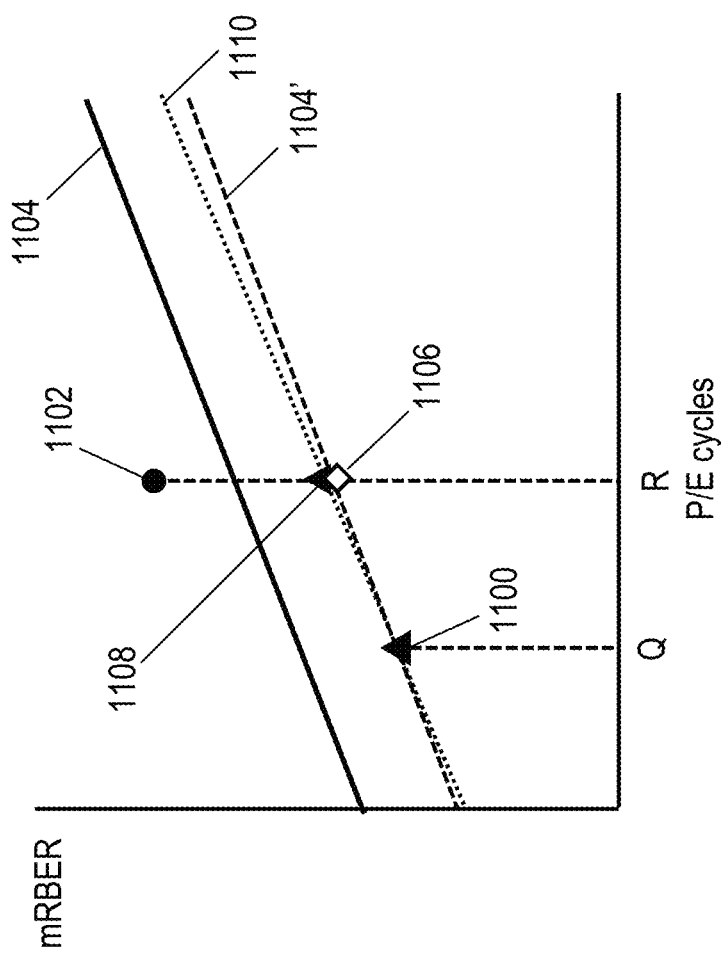
FIG. 11 illustrates the estimation of a value of block health metric reflective of the permanent effects of wear on a block.

In the example shown in FIG. 11, the controller has previously directly measured an mRBER value 1100 at PEC count Q during the previous base calibration or read sweep operation of the subject block of physical memory. However, at the subsequent PEC count R, the controller cannot use the current value 1102 of the block health metric for health binning because the current value of the mRBER reflects the contribution of transient effects, such as read disturbs and data retention. Consequently, the controller estimates the contribution to the mRBER of permanent effects only by shifting the previously selected reference block wear curve 1104 for the subject block until it intersects mRBER value 1100 to obtain shifted reference block wear curve 1104'. The controller then takes as the estimated value 1106 of the block health metric the Y value of the shifted reference block wear curve 1104' at a PEC count of R cycles. As indicated in FIG. 11, estimated value 1106 is close to the unknown actual value 1108 of the block health metric attributable to permanent effects, which lies along the actual wear curve 1110 of the block under consideration.

Returning to FIG. 10, following the estimation of the value of the block health metric at block 1006, the process passes to block 1008, which illustrates the controller determining the health grade of the block under consideration based on the estimated value of the block health metric determined at block 1006. As noted above, the controller may assign the health grade to the block based on which of multiple threshold values is/are exceeded by the estimated value of the block health metric. The process then proceeds to block 1010, which illustrates the controller determining whether or not all in-use blocks have been processed. If not, the controller selects a next block to be processed (block 1012), and the process returns iteratively to block 1004 and following blocks. If, however, the controller determines at block 1010 that all in-use blocks have been processed, the health binning process of FIG. 10 ends at block 1020.

Following health binning as shown, the controller may then utilize the health grades of the various blocks, for example, in the assignment of blocks to RTU queues 306, the construction of block stripes by build block stripes function 320, and the data placement performed by data placement function 310. In particular, as noted above, build block stripes function 320 preferably forms block stripes from blocks of the same or similar health grades, and data placement function 310 preferably places "hotter" (i.e., more frequently updated data) in healthier blocks and places "colder" (i.e., less frequently updated data) in less healthy blocks.

As has been described, in at least one embodiment, a controller of a non-volatile memory having a plurality of blocks of physical memory estimates a current value of a block health metric of the particular block based on a previous value of the block health metric and a reference block wear curve. The controller assigns the particular block a health grade based on the estimated current value of the block health metric and performs data placement in the block in accordance with the assigned health grade. The controller may calibrate a set of read threshold voltage for the particular block prior to estimating the current value of the block health metric.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

In addition, although embodiments have been described that include use of a NAND flash memory, it should be appreciated that embodiments of the present invention can also be used with any other type of non-volatile random access memory (NVRAM). Further, although the present application has been described with reference to embodiments that use the mRBER as the single health metric upon which the health grades of blocks are determined, it should be appreciated that in other embodiments one or more additional or alternative block health metrics may instead be utilized to assign health grades to blocks.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of health binning in a non-volatile memory having a plurality of blocks of physical memory controlled by a controller, the method comprising:

the controller estimating a current value at a time of the estimating of a first error component of a block health metric of a particular block among the plurality of blocks based on a previous value of the block health metric at a prior time prior to the estimating and a reference block wear curve, wherein the reference block wear curve relates differing values of the block health metric to differing program erase cycle counts, wherein at the time of the estimating the block health metric includes the first error component that reflects permanent effects of wear but not transient error effects and a different non-zero second error component that reflects transient error effects, and wherein the prior time is selected to be within a calibration interval following programming of the particular block such that the second error component of the previous value is reduced, said estimating including translating the reference block wear curve to match the previous value of the block health metric and determining the current value of the first error component from the translated reference block wear curve based on a program erase cycle count of the particular block at the time of the estimating; and the controller assigning the particular block a health grade based on the estimated current value of the first error component of the block health metric but not based on the second error component and performing data placement by writing data into the block in accordance with the assigned health grade.

2. The method of claim 1, and further comprising:
prior to the estimating, the controller calibrating a set of read threshold voltages of the particular block.

3. The method of claim 1, and further comprising:
characterizing the non-volatile memory to obtain characterization data for the non-volatile memory;
fitting the characterization data to a data model for the non-volatile memory; and
establishing a set of multiple reference block wear curves including the reference block wear curve from the data model.

4. The method of claim 1, and further comprising selecting the reference block wear curve from a set of multiple reference block wear curves based on the previous value of the block health metric and the estimated current value of the first error component.

5. The method of claim 1, wherein estimating the current value of the first error component of the block health metric of the particular block comprises estimating the current value of the first error component of the block health metric based on not having measured a value of the block health metric within a number of immediately previous program/erase cycles, the number being a positive integer.

6. The method of claim 1, wherein the block health metric is a bit error rate.

7. A computer program product, the computer program product comprising a computer readable storage medium having program instructions embodied therewith, the program instructions being executable by a controller of a non-volatile memory including a plurality of blocks of physical memory to cause the controller to perform:
estimating a current value at a time of the estimating of a first error component of a block health metric of a particular block among the plurality of blocks based on a previous value of the block health metric at a prior time prior to the estimating and a reference block wear curve, wherein the reference block wear curve relates differing values of the block health metric to differing program erase cycle counts, wherein at the time of the estimating the block health metric includes the first error component that reflects permanent effects of wear but not transient error effects and a different non-zero second error component that reflects transient error effects, and wherein the prior time is selected to be within a calibration interval following programming of the particular block such that the second error component of the previous value is reduced, said estimating including translating the reference block wear curve to match the previous value of the block health metric and determining the current value of the first error component from the translated reference block wear curve based on a program erase cycle count of the particular block at the time of the estimating; and assigning the particular block a health grade based on the estimated current value of the first error component of the block health metric but not based on the second error component and performing data placement by writing data into the block in accordance with the assigned health grade.

8. The program product of claim 7, wherein the program instructions are executable to cause the controller to perform:
prior to the estimating, the controller calibrating a set of read threshold voltages of the particular block.

9. The program product of claim 7, wherein the program instructions are executable to cause the controller to perform:
characterizing the non-volatile memory to obtain characterization data for the non-volatile memory;
fitting the characterization data to a data model for the non-volatile memory; and
establishing a set of multiple reference block wear curves including the reference block wear curve from the data model.

10. The program product of claim 7, wherein the program instructions are executable to cause the controller to perform:
selecting the reference block wear curve from a set of multiple reference block wear curves based on the previous value of the block health metric and the estimated current value of the first error component.

11. The program product of claim 7, wherein estimating the current value of the first error component of the block health metric of the particular block comprises estimating the current value of the first error component of the block health metric based on not having measured a value of the block health metric within a number of immediately previous program/erase cycles, the number being a positive integer.

12. The program product of claim 7, wherein the block health metric is a bit error rate.

13. A data storage system, comprising:
a controller for a non-volatile memory including a plurality of blocks of physical memory, wherein the controller is configured to perform:
estimating a current value at a time of the estimating of a first error component of a block health metric of a particular block among the plurality of blocks based on a previous value of the block health metric at a prior time prior to the estimating and a reference block wear curve, wherein the reference block wear curve relates differing values of the block health metric to differing program erase cycle counts, wherein at the time of the estimating the block health metric includes the first error component that reflects permanent effects of wear but not transient error effects and a different non-zero second error component that reflects transient error effects, and wherein the prior time is selected to be within a calibration interval following programming of the particular block such that the second error component of the previous value is reduced, said estimating including translating the reference block wear curve to match the previous value of the block health metric and determining the current value of the first error component from the translated reference block wear curve based on a program erase cycle count of the particular block at the time of the estimating; and
assigning the particular block a health grade based on the estimated current value of the first error component of the block health metric but not based on the second error component and performing data placement by writing data into the block in accordance with the assigned health grade.

14. The data storage system of claim 13, wherein the controller is configured to perform:
prior to the estimating, the controller calibrating a set of read threshold voltages of the particular block.

15. The data storage system of claim 13, wherein the controller is further configured to perform:
characterizing the non-volatile memory to obtain characterization data for the non-volatile memory;
fitting the characterization data to a data model for the non-volatile memory; and
establishing a set of multiple reference block wear curves including the reference block wear curve from the data model.

16. The data storage system of claim 13, wherein the controller is further configured to perform:
selecting the reference block wear curve from a set of multiple reference block wear curves based on the previous value of the block health metric and the estimated current value of the first error component.

17. The data storage system of claim 13, wherein estimating the current value of the first error component of the block health metric of the particular block comprises estimating the current value of the first error component of the block health metric based on not having measured a value of the block health metric within a number of immediately previous program/erase cycles, the number being a positive integer.

18. The data storage system of claim 13, and further comprising the non-volatile memory.

19. The data storage system of claim 13, wherein the block health metric is a bit error rate.

* * * * *